(12) United States Patent
Kanazawa et al.

(10) Patent No.: US 11,237,070 B2
(45) Date of Patent: Feb. 1, 2022

(54) SENSOR CONNECTOR (71) Applicants: SMK Corporation, Tokyo (JP); DENSO Corporation, Kariya (JP)

(72) Inventors: Kazuaki Kanazawa, Kanagawa (JP); Kiyoshi Asai, Kanagawa (JP); Takeshi Horikawa, Aichi (JP)

(73) Assignees: SMK Corporation, Tokyo (JP); DENSO Corporation, Aichi (JP)

( * ) Notice: Subject to any disclaimer, the term of this patent is extended or adjusted under 35 U.S.C. 154(b) by 0 days.

(21) Appl. No.: 16/889,785

(22) Filed: Jun. 1, 2020

(65) Prior Publication Data
US 2020/0292402 A1 Sep. 17, 2020

Related U.S. Application Data (63) Continuation of application No. PCT/JP2018/023217, filed on Jun. 19, 2018.

(30) Foreign Application Priority Data

Dec. 26, 2017 (JP) .............................. JP2017-248855

(51) Int. Cl.
*G01L 19/00* (2006.01)
*G01L 9/08* (2006.01)
(Continued)

(52) U.S. Cl.
CPC ............ *G01L 19/0092* (2013.01); *G01L 9/08* (2013.01); *G01L 19/0084* (2013.01);
(Continued)

(58) Field of Classification Search
CPC ............ G01L 19/0084; G01L 19/0092; G01L 19/143; G01L 23/10; G01L 23/26; G01L 9/08
See application file for complete search history.

(56) References Cited

U.S. PATENT DOCUMENTS 9,310,229 B2 * 4/2016 Herderich ........... G01L 19/0084
2002/0062697 A1 5/2002 Yamagishi
(Continued)

FOREIGN PATENT DOCUMENTS

JP 2002071499 A 3/2002
JP 2003529070 A 9/2003
(Continued)

OTHER PUBLICATIONS

(ISA/237) Written Opinion of the International Search Authority for International Patent Application No. PCT/JP2018/023217, issued/mailed by the Japan Patent Office dated Sep. 11, 2018.
(Continued)

*Primary Examiner* — Nimeshkumar D Patel
*Assistant Examiner* — Jean F Morello (57) ABSTRACT

A sensor connector compatible with various sensor unit repertoires and capable of improving production efficiency is provided. The sensor connector includes terminal modules to be inserted into a module inserted portion, and commonized pogo pin type terminal module is brought into contact with a connection terminal via slide contact segments capable of sliding relative to the connection terminal exposed to a region closer to the module inserted portion. Thus, the sensor connector can be compatible with the sensor unit 1 having various repertoires by changing, for example, the arrangement and the number of poles of the module inserted portions of the connector housing.

3 Claims, 9 Drawing Sheets

(51) Int. Cl.
*G01L 19/14* (2006.01)
*G01L 23/10* (2006.01)
*G01L 23/26* (2006.01)

(52) U.S. Cl.
CPC ............ *G01L 19/143* (2013.01); *G01L 23/10* (2013.01); *G01L 23/26* (2013.01)

(56) References Cited

U.S. PATENT DOCUMENTS

| | | |
|---|---|---|
| 2002/0111730 A1 | 8/2002 | Thorum |
| 2003/0233881 A1 | 12/2003 | Naegele |
| 2009/0282926 A1 | 11/2009 | Hauer |

FOREIGN PATENT DOCUMENTS

| | | |
|---|---|---|
| JP | 2008128644 A | 6/2008 |
| JP | 2010243428 A | 10/2010 |
| WO | 2016198335 A1 | 12/2016 |

OTHER PUBLICATIONS

Office Action issued for counterpart German Application 112018006611.8, issued by the German Patent and Trade Mark Office dated Oct. 27, 2021.

\* cited by examiner

(RELATED ART)

SENSOR CONNECTOR

CROSS REFERENCE TO RELATED APPLICATION

The contents of the following Japanese patent application are incorporated herein by reference,
Japanese Patent Application No. 2017-248855 filed on Dec. 26, 2017 and
International Application No. PCT/JP2018/023217 filed on Jun. 19, 2018.

FIELD

The present invention relates to a connector for connecting a sensor to an electronic device and, in particular, to a sensor connector used for connecting, for example, a pressure sensor used in a fuel injection device of an internal combustion engine to a control device.

BACKGROUND

A fuel injection device of an internal combustion engine conventionally includes a pressure sensor in order to monitor and control a combustion pressure generated in each of cylinders or a pressure in a common rail.

Figure 7A:
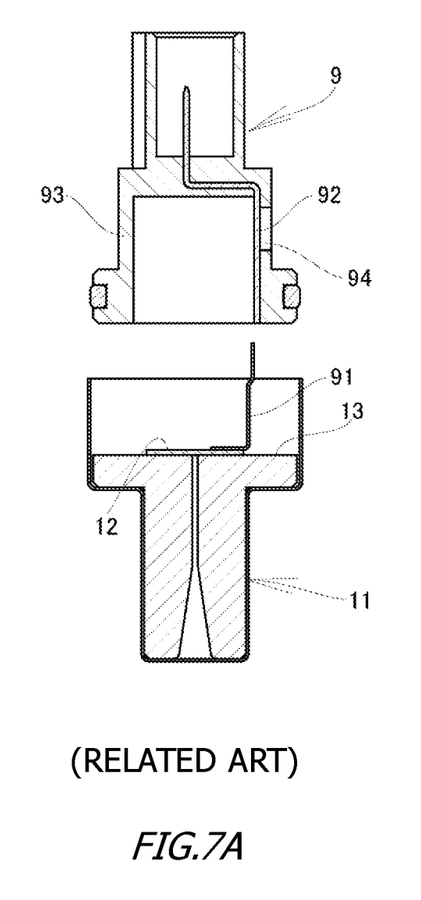
FIG. 7A is a cross-sectional view illustrating a related method of attaching a sensor connector to a sensor unit.
Figure 7B:
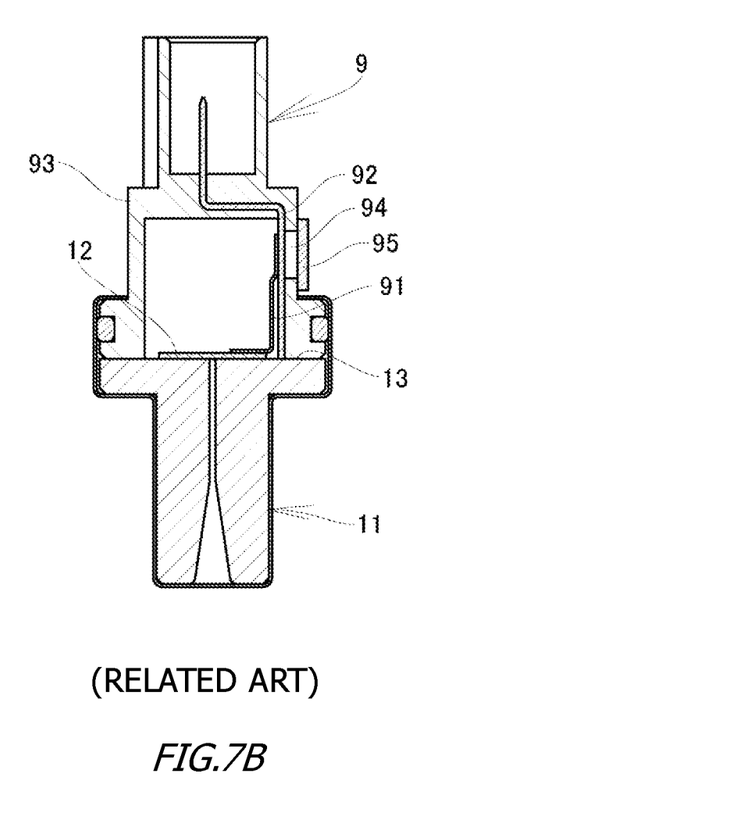
FIG. 7B is a cross-sectional view illustrating a related method of attaching a sensor connector to a sensor unit.

As shown in FIGS. 7A and 7B, this type of pressure sensor includes: a sensor unit 1 having a sensor body 12 disposed at a joined end of a sensor housing 11; and a connector 9 to be assembled to the sensor unit 1 and connected to the sensor body 12. This type of pressure sensor is configured so that electrical connection between the sensor body 12 and a cable, for example, can be established via the connector 9.

The connector 9 includes: a lead terminal 91 to be connected to a surface of the sensor body 12; a connection terminal 92 to be connected to the lead terminal 91; and a housing 93 for holding the connection terminal 92. The connector 9 is configured so that electrical connection between the connection terminal 92 and the sensor body 12 can be established via the lead terminal 91.

The lead terminal 91 is connected to the sensor body 12 by welding, for example, in advance. Assembling the housing 93 and the sensor housing 11 to each other brings the lead terminal 91 and the connection terminal 92 into contact with each other. In such a state, the terminals 91 and 92 are welded by utilizing a welding hole 94 opened in the housing 93. Note that the reference numeral 95 in the figure denotes a sealing cover to seal the welding hole 94.

Among this type of connectors, there has also been known a connector including a spring lead terminal between a sensor body and a connection terminal and configured so that the lead terminal is in elastic contact with a surface of a sensor substrate by assembling a housing to the sensor part (see Patent Literature 1, for example).

CITATION LIST

Patent Literature

Patent Literature 1: Japanese Translation of PCT Patent Application Publication No. 2003-529070

SUMMARY

Technical Problem

In the related technique as described above, however, the sensor unit to be connected to the connector has varieties (repertoires), and each sensor unit has a different number of poles in the sensor body, a different position at which the lead terminal is in contact with the sensor body, etc.

Thus, the connectors to be connected to the respective sensor units each have a different shape and arrangement of the lead terminal as well as a different shape and arrangement of the connection terminal to be connected to that lead terminal in accordance with its corresponding sensor unit. The housing for accommodating these elements also needs to be set for each corresponding sensor unit.

That is, for such a related sensor connector, a dedicated sensor connector needs to be prepared for each sensor unit repertoire. The connectors have no commonized components and need to use their own parts. This leads to problems of a complicated production process and an increased production cost.

Moreover, when the structure in which the sensor body and the lead terminal are connected to each other in advance is employed in the related technique, the step of welding the sensor body and the lead terminal together and the step of welding the lead terminal and the connection terminal together need to be gone through. This leads to problems of complicated assembly and deteriorated operating efficiency.

Moreover, in order to weld the lead terminal and the connection terminal together, the welding hole needs to be provided in the connector housing, and the welding hole needs to be closed after the completion of the welding.

Thus, in view of such conventional problems, the present invention has been made to provide a sensor connector compatible with various sensor unit repertoires and capable of improving production efficiency.

Solution to Problem

An aspect of the invention according to claim 1 for solving the conventional problems as described above is characterized in that a sensor connector to be assembled to a sensor unit having a sensor body disposed at a joined end of a sensor housing and connected to the sensor body includes: a connector housing to be joined to the sensor housing; a connection terminal held by the connector housing; and a terminal module to be inserted into a module inserted portion opened through a surface of the connector housing to face the sensor body. The terminal module includes: a module base to be fixed into the module inserted portion; a movable contact movably coupled to the module base; and biasing member intervening between the module base and the movable contact. The movable contact includes a slide contact segment capable of sliding relative to the connection terminal exposed to a region closer to the module inserted portion, the movable contact is biased by the biasing member so as to protrude from the surface of the connector housing to face the sensor body, and the movable contact is in contact with the sensor body by joining the connector housing to the sensor housing.

In addition to the configuration of claim 1, another aspect of the invention according to claim 2 is characterized in that the slide contact segment is formed in a cantilever spring shape extending in a diagonally outward direction from a side surface of the movable contact.

In addition to the configuration of claim 1 or 2, another aspect of the invention according to claim 3 is characterized in that the module base includes: an end plate having a flat plate shape; and a guide side plate arranged to erect from a side edge of the end plate. The movable contact includes: a slide plate slidably overlaid on an outer side of the guide side plate; and a contact portion supported by a leading end of the slide plate and to be pressed against the sensor body. Engagement protrusions protruded from opposed surfaces of one of the slide plate and the guide side plate are inserted into long holes elongated in a slide direction and provided in opposed surfaces of the other one of the slide plate and the guide side plate, and the biasing member is supported by the end plate, thereby biasing the contact portion in a direction separating from each other.

As a result of the sensor connector of the aspect of the present invention having the configuration according to claim 1, a modularized common terminal module can be used for sensor units having various repertoires, and operations of an automatic assembly machine can be unified. In addition, the efficiency of assembly operations can be improved, and cost reduction can be achieved.

Moreover, as a result of having the configuration according to claim 2 in the another aspect of the present invention, the movable contact can smoothly slide against the connection terminal and a suitable contact pressure can be maintained.

Furthermore, as a result of having the configuration according to claim 3 in the another aspect of the present invention, the terminal module can be formed with a minimum number of parts.

DESCRIPTION OF EMBODIMENTS

An embodiment of a sensor connector according to the present invention will next be described on the basis of a working example shown in FIGS. 1 to 6. Note that components similar to those in the above-described conventional example will be denoted by the same reference numerals, and descriptions thereof will be omitted.

The present working example will be described taking, as an example, a pressure sensor A for monitoring and controlling a combustion pressure generated in each of cylinders in an internal combustion engine or a pressure in a common rail. In the figure, the reference numeral 1 denotes a sensor unit, and the reference numeral 2 denotes a sensor connector.

Figure 1:
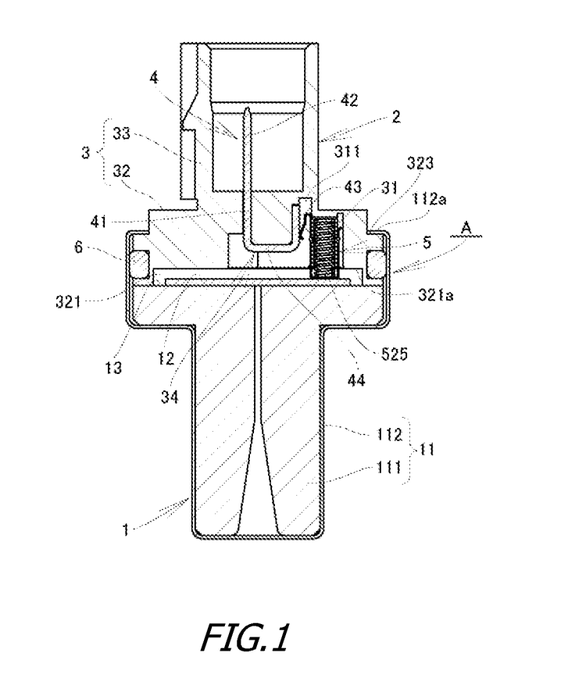
FIG. 1 is a cross-sectional view illustrating an example of a sensor employing a sensor connector according to the present invention.
Figure 2:
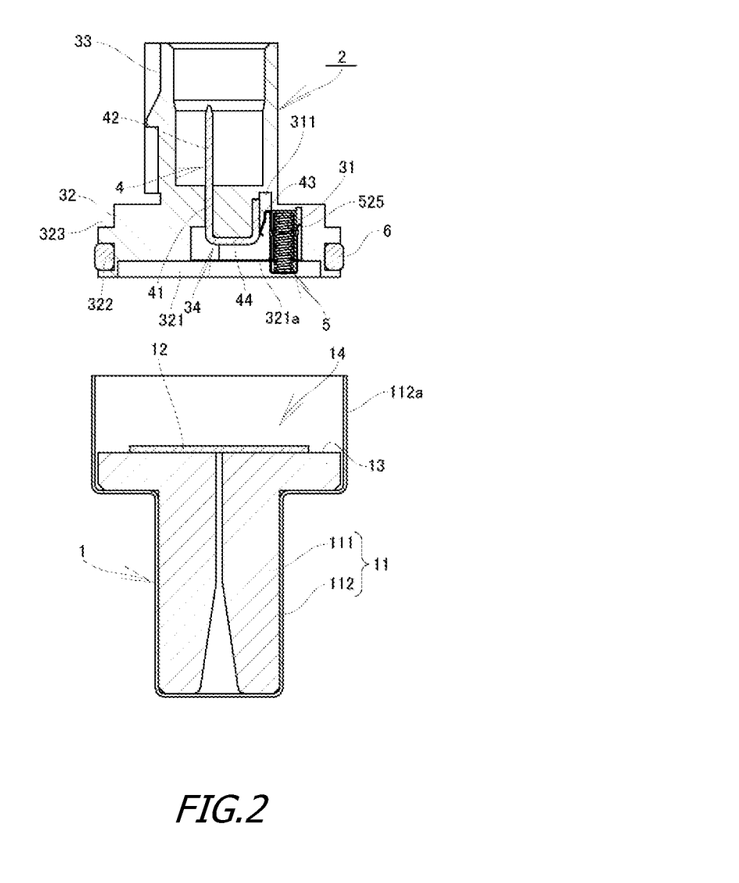
FIG. 2 is an exploded perspective view of the sensor in FIG. 1.

As shown in FIGS. 1 and 2, this type of pressure sensor A includes the sensor unit 1 having a sensor body 12 (piezoelectric sensor) disposed at a joined end of a sensor housing 11. This type of pressure sensor A is configured so that the sensor connector 2 is assembled to the sensor unit 1 and electrical connection to, for example, a cable (not shown) connected to a control unit in the internal combustion engine is established via the sensor connector 2.

The sensor housing 11 includes, for example, a molded body 111 made of an insulating resin, and a cover 112 that covers the exterior of the molded body 111. A joined end face 13 on which the sensor body 12 is disposed is surrounded by a connector-side peripheral wall 112a of the cover 112. The sensor housing 11 is provided with a depressed connector fitted portion 14 into which an end of the sensor connector 2 is fitted.

Figure 3A:
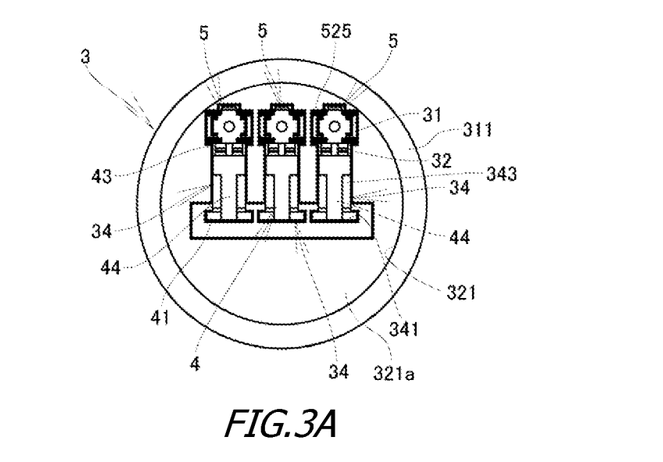
FIG. 3A is a plan view illustrating the sensor connector in FIG. 1.
Figure 3B:
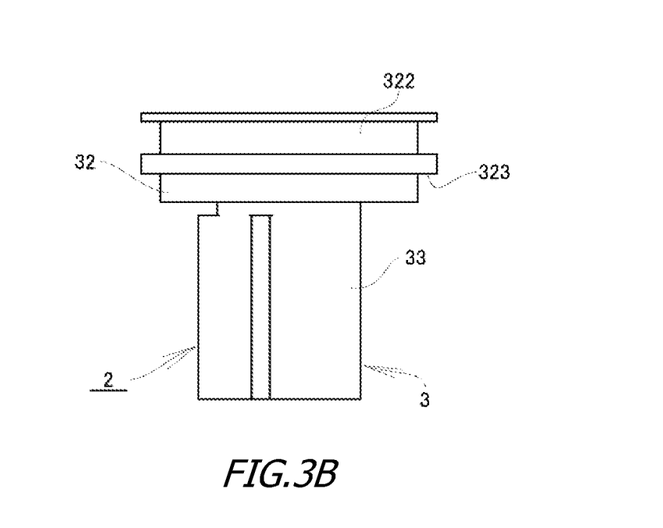
FIG. 3B is a side view of the sensor connector.
Figure 3C:
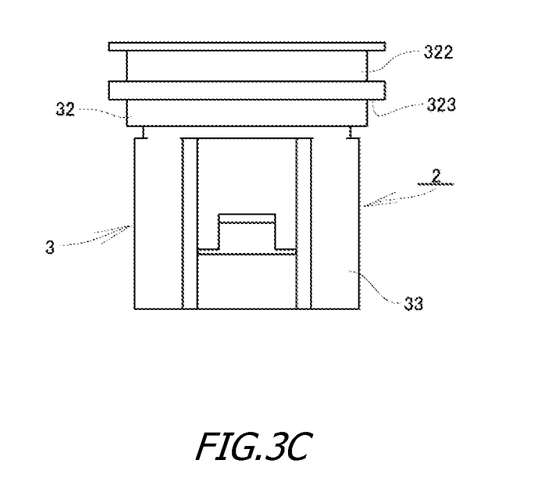
FIG. 3C is a front view of the sensor connector.
Figure 4:
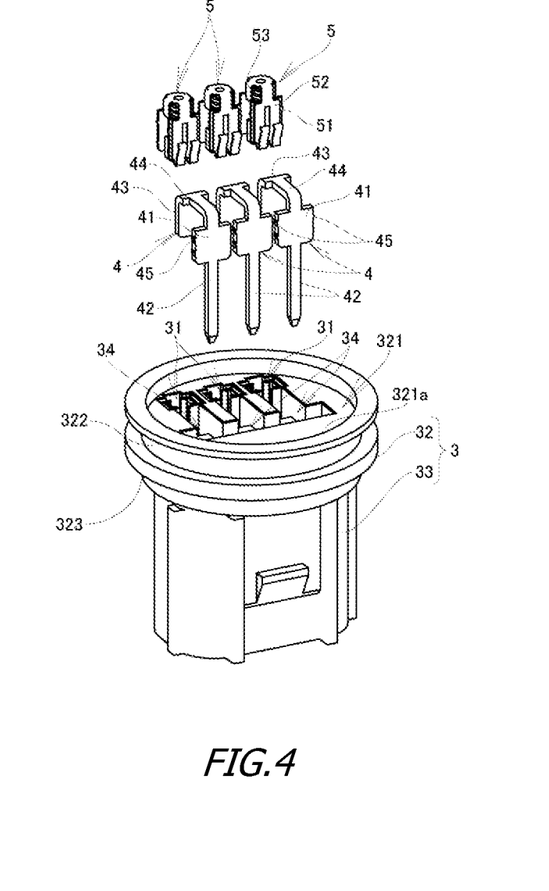
FIG. 4 is an exploded perspective view illustrating the sensor connector in FIG. 1.

As shown in FIGS. 3A to 4, the sensor connector 2 includes: a connector housing 3 to be joined to the sensor housing 11; connection terminals 4, 4, . . . held by the connector housing 3; and terminal modules 5, 5, . . . to be inserted into module inserted portions 31, 31, . . . opened through a surface of the connector housing 3 to face the sensor body 12. By inserting the terminal modules 5, 5, . . . into the connector housing 3 formed in accordance with the aspect of the sensor unit 1, i.e., the number of poles and arrangement of the sensor body 12, etc., the sensor connector 2 can be compatible with a wide variety of sensor units 1.

As shown in FIG. 4, the connection terminals 4, 4, . . . are each formed by punching out and then bending a conductive metallic material. The connection terminals 4, 4, . . . each include: a rectangular fixed segment 41; a pin-shaped terminal body 42 that extends from one end of the fixed segment 41; a contact segment 43 that faces the fixed segment 41 with a distance therebetween; and a connecting segment 44 that connects between the fixed segment 41 and the contact segment 43. Note that the reference numeral 45 in the figure denotes locking protrusions provided in a protruding manner at both side edges of the fixed segment 41.

As shown in the figure, the connector housing 3 is integrally formed with an insulating resin and includes: a sensor-side fitted portion 32 to be fitted into the connector fitted portion 14 of the sensor housing 11; and a tubular external connection portion 33 disposed at the other end of the sensor-side fitted portion 32.

The sensor-side fitted portion 32 is formed in a flat cylindrical shape to be overlaid on the joined end face 13 of the sensor housing 11. The sensor-side fitted portion 32 includes a depression 321 in its joined surface portion. A bottom surface 321a of the depression 321 faces the sensor body 12 with a distance therebetween.

An outer periphery of the sensor-side fitted portion 32 is provided with a water stop member groove 322 into which a water stop member 6, such as an O-ring, is fitted. When the sensor-side fitted portion 32 is fitted into the connector fitted portion 14, a gap between the sensor-side fitted portion 32 and the connector-side peripheral wall 112a is sealed by the water stop member 6.

An outer peripheral portion of the sensor-side fitted portion 32 on the other end side is provided with a fixing stepped portion 323. By bringing an end of the connector-side peripheral wall portion 112a and the fixing stepped portion 323 into engagement by means of swaging as shown in FIG. 1, the connector housing 3 is fixed to the sensor housing 11 while being joined to the sensor housing 11.

The sensor-side fitted portion 32 includes the module inserted portions 31, 31, . . . in accordance with the aspect of the sensor body 12, i.e., the number of poles and arrangement of terminals of the sensor body 12. The sensor-side fitted portion 32 also includes connection terminal holding portions 34, 34, . . . for holding the connection terminals 4, 4, . . . , which are provided adjacent to the module inserted portions 31, 31, . . . .

The module inserted portions 31, 31, . . . are each formed in a rectangular hole shape opened through a surface facing the sensor body 12, i.e., the bottom surface 321a of the depression. The module inserted portions 31, 31, . . . each have a predetermined depth in a joined direction.

On a side closer to the connection terminals 4, 4, . . . , the module inserted portions 31, 31, . . . are each provided with a rectangular hole-shaped communicating groove 311 in the joined direction. The communicating groove 311 is provided so as not to prevent, when a later-described movable contact 52 of each of the terminal modules 5, 5, . . . moves in the joined direction, the movement of the movable contact 52 (slide contact segments 525, 525).

The connection terminal holding portion 34 includes: a fixed segment insertion hole 341 into which the fixed segment 41 of the connection terminal 4 is inserted; a terminal insertion hole 342 communicated with the fixed segment insertion hole 341 and penetrating into the external connection portion 33; and an accommodation groove portion 343 for accommodating the connecting segment 44. As a result of the fixed segment 41 being pressed into the fixed segment insertion hole 341, the terminal body 42 protrudes into the external connection portion 33 through the terminal insertion hole 342, and the contact segment 43 is exposed to a region closer to the module inserted portion 31, i.e., in the communicating groove 311.

Figure 5:
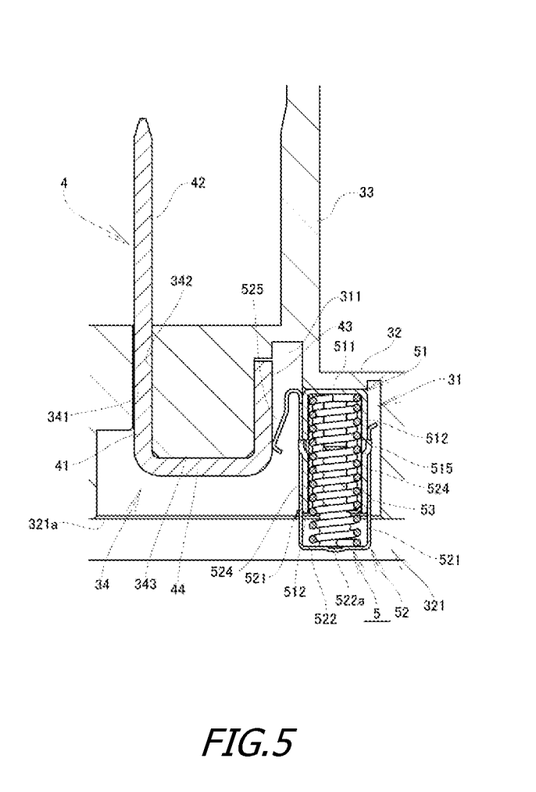
FIG. 5 is an enlarged cross-sectional view illustrating a terminal module portion in the sensor connector in FIG. 1.
Figure 6:
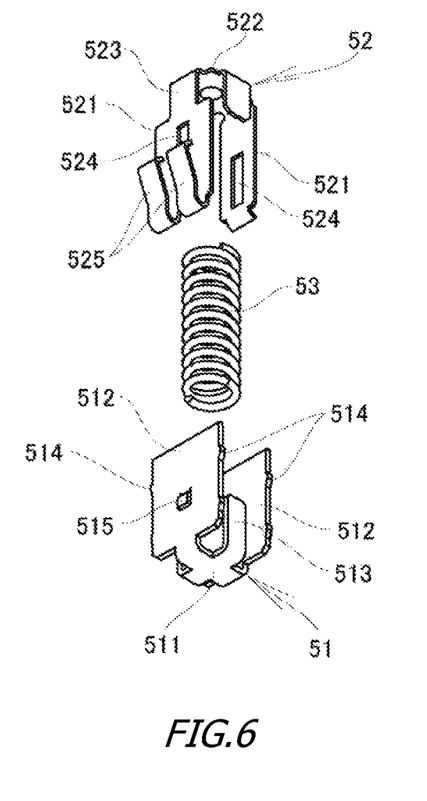
FIG. 6 is an exploded perspective view illustrating a terminal module in FIGS. 3A-3C.

As shown in FIGS. 5 and 6, the terminal modules 5, 5, . . . each include: a module base 51 to be fixed into the module inserted portion 31; the movable contact 52 movably coupled to the module base 51; and biasing member 53 intervening between the module base 51 and the movable contact 52. The module base 51, the movable contact 52, and the biasing member 53 are assembled together and modularized (integrated) in a state conductive to one another.

The module base 51 is formed by punching out and then bending a conductive metallic plate material. The module base 51 includes: an endplate 511 in the shape of a cross flat plate; a pair of guide side plates 512 erecting from opposed side edges of the end plate 511; and biasing member holding segments 513, 513 erecting from the other side edges of the end plate 511.

The guide side plate 512 is formed in a rectangular shape. The guide side plate 512 includes fixation locking segments 514, 514 integrally provided in a protruding manner at both side edges thereof to dig into and engage with an inner wall of the module inserted portion 31.

The guide side plate 512 includes an engagement protrusion 515 protruding outwardly in a central portion on a front surface thereof and having a stepped portion 515a on a side closer to the end plate 511.

The biasing member holding segments 513, 513 are each formed in a strip shape. The biasing member holding segments 513, 513 are opposed to each other with a distance approximately equal to the diameter of the biasing member 53 therebetween. Interposing the biasing member 53 between the biasing member holding segments 513, 513 can prevent the biasing member 53 from being dropped off from a region between the opposed guide side plates 512, 512.

The movable contact 52 is integrally formed by punching out and then bending a conductive metallic plate material. The movable contact 52 includes: a pair of slide plates 521, 521 to be each slidably overlaid on an outer side of the guide side plate 512 in an opposed manner; and a contact portion 522 supported by leading ends of the slide plates 521, 521 and to be pressed against the sensor body 12.

The slide plate 521 is formed in a rectangular shape. A side edge of the contact portion 522 is integrally supported by the leading end side of the slide plate 521 via a supporting portion 523.

Each slide plate 521 includes, in a central portion thereof, a slide hole 524 in the shape of a long hole extending in a moving direction of the movable contact 52. The engagement protrusion 515 of the guide side plate 512 is inserted into the slide hole 524, and the slide plates 521, 521 are each guided by the guide side plate 512. The movable contact 52 can slide relative to the module base 51 by an amount corresponding to the length of the slide hole 524.

One of the slide plates 521, 521 integrally supports the slide contact segments 525, 525 to be slidably in contact with the contact segment 43 exposed in the communicating groove 311.

The slide contact segments 525, 525 are each formed by outwardly folding a strip-shaped segment whose base end is integrally supported by an end edge of the slide plate 521 so as to have a cantilever spring shape extending in a diagonally outward direction from a side surface of the movable contact 52. Note that leading ends of the slide contact segments 525, 525 are each provided with an arc-like contact point portion 525a.

The contact portion 522 is formed in a rectangular shape and includes, in a central portion thereof, an integrally-formed contact point 522a protruding toward the front side.

The biasing member 53 is constituted by a coil spring. The biasing member 53 is configured so that one end thereof is supported by the end plate 511, and the other end thereof pushes the contact portion 522 and thereby biases the movable contact 52 in the pushing direction.

For the terminal modules 5, 5, . . . , the biasing member 53, which is constituted by the coil spring, is inserted between the biasing member holding segments 513, 513 of the module base 51, and the movable contact 52 is assembled to the module base 51 while the biasing member 53 in such a state is being pushed into the movable contact 52 as shown in FIG. 6. As a result, the engagement protrusion 515 is inserted into the slide hole 524, and the movable contact 52 is slidably joined to the module base 51. In this manner, the module base 51, the movable contact 52, and the biasing member 53 are integrated (modularized) with a single action.

By pressing the terminal modules 5, 5, . . . into the module inserted portions 31, 31, . . . , the terminal modules 5, 5, . . . can be easily attached to the connector housing 3 in such a manner that the fixation locking segments 514, 514 of the module base 51 dig into the inner wall of each of the module inserted portions 31, 31, . . . , and the movable contact 52 protrudes from the joined end face so as to be capable of being pushed in. In addition, the slide contact segments 525, 525 are slidably in contact with the connection terminals 4, 4, . . . exposed to the regions closer to the module inserted portions 31, 31, . . . , i.e., the contact segment 43 exposed in the communicating groove 311.

According to the thus configured sensor connector 2, by employing common pogo pin (insulation displacement contact) terminal modules 5, 5, . . . compatible with the aspects of a wide variety of sensor units 1 as terminals to be in contact with the sensor body 12 and by pressing (inserting) such terminal modules 5, 5, . . . into module insertion portions of the connector housing 3 corresponding to each repertoire, the terminals can be easily incorporated into the connector housing 3 and electric conduction between the terminal modules 5, 5, . . . and the connection terminals 4, 4, . . . can be reliably ensured without employing welding or the like.

Thus, the commonized terminal modules 5, 5, . . . allow the sensor connector 2 to be compatible with the sensor unit 1 having various repertoires by changing, for example, the arrangement and the number of poles of the module inserted portions 31, 31, . . . of the connector housing 3.

The shape of the connection terminals 4, 4, . . . is not limited to the shape in the above-described working example. Since it is only necessary that the connection terminals 4, 4, . . . include the contact segments 43 exposed to the module inserted portions 31, 31, . . . , the connection terminals 4, 4, . . . can be freely designed in accordance with the aspect of their corresponding sensor unit 1.

Since the sensor connector 2 has the modularized common terminal modules 5, 5, . . . , operations of an automatic assembly machine, for example, can be unified, and the efficiency of assembly operations can be improved and cost reduction can thus be achieved.

Although the above-described working example has been described taking, as an example, the pressure sensor A for an internal combustion engine, the type and aspect of the sensor unit 1 are not limited to those in the above-described working example. For example, the sensor body 12 may be a sensor other than the piezoelectric sensor. The aspects of the sensor housing 11 and the connector housing 3 are also not limited to those in the above-described working example.

Although the above-described working example has described the example in which the slide contact segment 525 is formed in a cantilever spring shape, the aspect of the slide contact segment is not limited thereto. A cantilever spring may be provided in a connection terminal, a slide contact segment may be formed in a flat plate shape, and the slide contact segment may be brought into contact with the cantilever spring of the connection terminal in a slidable manner.

REFERENCE SIGNS LIST 1 sensor unit
11 sensor housing
111 molded body
112 cover
13 joined end face
14 connector fitted portion
12 sensor body (piezoelectric sensor)
2 sensor connector
3 connector housing
31 module inserted portion
311 communicating groove
32 sensor-side fitted portion
321 depression
322 water stop member groove
323 fixing stepped portion
33 external connection portion
34 connection terminal holding portion
341 fixed segment insertion hole
342 terminal insertion hole
343 accommodation groove portion
4 connection terminal
41 fixed segment
42 terminal body
43 contact segment
44 connecting segment
45 locking protrusion
5 terminal module
51 module base
511 end plate
512 guide side plate
513 biasing member holding segment
514 fixation locking segment
515 engagement protrusion
52 movable contact
521 slide plate
522 contact portion
523 supporting portion
524 slide hole
525 slide contact segment
53 biasing member
6 water stop member

The invention claimed is:

1. A sensor connector to be assembled to a sensor unit having a sensor body disposed at a joined end of a sensor housing and connected to the sensor body,
the sensor connector comprising: a connector housing to be joined to the sensor housing; a connection terminal held by the connector housing; and a terminal module to be inserted into a module inserted portion opened through a surface of the connector housing to face the sensor body, wherein
the terminal module includes: a module base to be fixed into the module inserted portion; a movable contact movably coupled to the module base; and biasing member intervening between the module base and the movable contact, and
the movable contact includes a slide contact segment capable of sliding relative to the connection terminal exposed to a region closer to the module inserted portion, the movable contact is biased by the biasing member so as to protrude from the surface of the connector housing to face the sensor body, and the movable contact is in contact with the sensor body by joining the connector housing to the sensor housing.

2. The sensor connector according to claim 1, wherein the slide contact segment is formed in a cantilever spring shape extending in a diagonally outward direction from a side surface of the movable contact.

3. The sensor connector according to claim 1, wherein
the module base includes: an end plate having a flat plate shape; and a guide side plate arranged to erect from a side edge of the end plate,
the movable contact includes: a slide plate slidably overlaid on an outer side of the guide side plate; and a contact portion supported by a leading end of the slide plate and to be pressed against the sensor body, and
engagement protrusions protruded from opposed surfaces of one of the slide plate and the guide side plate are inserted into long holes elongated in a slide direction and provided in opposed surfaces of the other one of the slide plate and the guide side plate, and the biasing member is supported by the end plate, thereby biasing the contact portion and the end plate in a direction separating from each other.

* * * * *